United States Patent [19]

Trivett

[11] Patent Number: 5,055,325

[45] Date of Patent: Oct. 8, 1991

[54] AQUEOUS BLANKING SOLUTION FOR SOLID FILM PRELUBE FORMING OPERATIONS

[75] Inventor: Robert L. Trivett, Aurora, Ill.

[73] Assignee: Nalco Chemical Company, Naperville, Ill.

[21] Appl. No.: 541,109

[22] Filed: Jun. 20, 1990

[51] Int. Cl.$^5$ .............................................. B05D 3/02
[52] U.S. Cl. .................................... 427/388.1; 72/42; 252/389.61; 252/389.62; 252/396; 422/17
[58] Field of Search .................. 72/42; 252/49.5, 49.6, 252/73, 78.1, 389.61, 389.62, 396; 422/17; 427/388.1

[56] References Cited

U.S. PATENT DOCUMENTS

| 4,171,282 | 10/1979 | Mueller | 252/8.05 X |
| 4,753,743 | 6/1988 | Sech | 72/42 X |
| 4,846,986 | 7/1989 | Trivett | 252/49.5 |
| 4,854,969 | 8/1989 | Bassemir et al. | 106/20 X |
| 4,898,687 | 2/1990 | Parker et al. | 252/389.61 |
| 4,956,110 | 9/1990 | Lenack et al. | 72/42 X |

Primary Examiner—Michael Lusignan
Attorney, Agent, or Firm—Robert A. Miller; Donald G. Epple

[57] ABSTRACT

A blanking solution containing surfactants, corrosion inhibitors, and optionally biocides and antifoam agents can be applied to steel blanks in a stamping or drawing mill to prevent the transfer of solid film prelube lubricants from the steel blanks to the transfer rolls in the mill. The surfactant is preferably a nonionic surfactant which does not have any essential effect on the coefficient of friction when the prelubed steel blanks are stamped or drawn to form the final part.

6 Claims, No Drawings

5,055,325

AQUEOUS BLANKING SOLUTION FOR SOLID FILM PRELUBE FORMING OPERATIONS

INTRODUCTION

The present invention is in the technical field of metal working operations and the use of lubricants used therein, particularly solid-film prelubes used on coiled steel and the use of this prelubricated coiled steel in the manufacture of various automotive and appliance parts and metal pieces. The area of the invention also particularly relates to blanking of the coiled steel prior to its being stamped or drawn into its final shape. Blanking is a process where a steel coil is cut into specific sizes, called sheets or blanks, which blanks are then formed into a rough final part by stamping or drawing on mechanical presses which stamp or draw the blank into the desired shape or the desired steel part. By steel we mean carbon steel, stainless steel, galvanized steel, or any other type of ferrous steel component which is normally shaped by treating, blanking, shaping, stamping or drawing a steel coil made from the same.

These blanking operations end with a pre-cut shaped steel plate, which plate is then either transported directly to the stamping or drawing operations or stored prior to being used in the stamping or drawing operation. These stamping and drawing operations can take the form of any normal press stamping or drawing operation known to the artisan.

The steel blanks or sheets leave the blanking press, which is simply a cutting press which cuts the steel coil to various blanks of prescribed and predesigned size, and the blanks are then moved either into storage or directly to the forming press via a transfer or blanking line. These transfer or blanking lines normally have a number of transfer rolls or wheels which aid in the transfer of the blanks from one point in the mill to another point in the mill. The last point is of course either the forming or stamping press or the drawing operations.

These steel blanks are transferred along the transfer line via a number of these transfer rolls or wheels which continually revolve resulting in the movement of these blanks from one set of rolls to the next set of rolls and so on. These transfer rolls are usually coated with some type of hard, durable rubber or composite compound which assists in the transfer of these blanks along the line.

When the steel coil is prelubed by either a solid-film prelube as described in U.S. Pat. No. 4,753,743, Sech, which solid-film prelube is primarily formed from what is referred to as a hot melt lubricant, or when this solid-film prelube is formed from an oil-in-water dry film prelube emulsion as in U.S. Pat. No. 4,846,986, Trivett, the transfer rolls or wheels can leave mars on the prelube dry film and cause difficulties in the transfer of the blank along the line.

In addition, if the marring process on the prelubed film becomes extreme, part of the prelube can transfer to the surfaces of the transfer rolls and cause further accumulation and build-up of this solid-film prelube on the transfer rolls. Where the rolls continuously contact the moving blanks there can be friction between the rolls and the prelube coatings resulting in coating being deposited on the rolls, and mars and scrapes being formed on the solid-film prelube surface such that the coating can become discontinuous, and the proper lubricant use of the pre-lube coating in the stamping and drawing operation hindered.

The build up of this residue from the transfer of pre-lube film to the transfer rolls and wheels and the marring of the surfaces of the dry film prelube on the blank steel can seriously affect overall performance of the blanking line in several ways. For example, the transfer rolls can redeposit the film coatings onto other blanks moving over these same transfer line. This redeposited coating forms objectionable patterns on the blanks that can affect forming performance by causing build up on the dies. Additionally, if build up is severe on the transfer rolls, line speeds of the blanking lines can be delayed causing blanks to move into the presses at incorrect speeds. This causes hindered forming performance in the stamping presses by effecting how the blanks enter the presses. If the blanks enter the presses at incorrect speeds or at the wrong rate, the presses may jam and ultimately lower production rates of the final formed parts.

OBJECTS OF THE INVENTIONS

Therefore, it is an object of this invention to inhibit the transfer of solid-film prelubes and lubricants from the steel coil and the blanks formed therefrom to the transfer rolls and wheels which aid in the transfer of these blanks into stamping presses and drawing lines.

It is further an object of this invention to inhibit the build up of solid-film prelube lubricants from the surface of steel blanks to the transfer rolls used to transfer these blanks into a stamping press.

It is yet another object of this invention to provide for a method of preventing solid-film prelubed and lubricant transfer from solid prelubricant films deposited on metal surfaces to the transfer rolls or wheels which comprises applying to these solid prelubricant film surfaces adhered to the metal, particularly steel surfaces, an effective amount for the purpose of preventing transfer of prelubed films to the transfer rolls of an aqueous solution which contains a surfactant which, when so applied, does not appreciably change the coefficient of friction between the prelubed filmed metal surface and the stamping press dies, and which aqueous solution may also contain corrosion inhibitors, anti-foaming agents, biocidally active materials, and deionized water.

THE INVENTION

Filmed lubricants, such as the hot melt metal working lubricants in U.S. Pat. No. 4,753,743, Sech, and those formed from the emulsions in U.S. Pat. No. 4,846,986, Trivett, both patents being incorporated herein by reference, form solid-film prelube lubricant films on metal surfaces when appropriately applied according to the teachings of the above patents. This filmed prelube material is normally formed on steel coils and these steel coils then fed into a blanking operation where the steel coil is cut to prescribed sizes and transferred into the stamping mill when convenient to the operator.

The transfer of these prelube film blanks over a transfer line that contains transfer rolls and wheels causes the difficulties described above. The solid-film prelube can transfer to the transfer rolls or surfaces of the transfer wheels and the contact between the transfer wheels and the solid film surface on the metal becomes marred and can interrupt stamping operations as described earlier. We have discovered a method of preventing solid-film prelube and lubricant transfer from the solid prelubricant films formed on metal surfaces to transfer rolls and wheels on a transfer line which comprises spraying or misting onto the solid prelubricant films on said metal surfaces an effective amount for the purpose of preventing solid-film prelube transfer to transfer wheels of an aqueous solution which contains the following ingredients:

(1) A surfactant which does not appreciably change the coefficient of friction between the prelubed film metal surfaces and the stamping press dies.
(2) Corrosion inhibitors
(3) Anti-foaming agents
(4) Biocidically active materials, and
(5) Deionized water.

THE SURFACTANTS

The surfactants which have been found useful are those surfactants outlined in McCutcheon Emulsifiers and Detergents, North American Edition, 1984 annuals, published by McCutcheon Publications, 175 Rock Road, Glenrock, N.J., in 1984, which publication is incorporated herein by reference. These surfactants can particularly include any and all of the nonionic surfactants listed therein, particularly those nonionic surfactants which are water soluble and/or water dispersable. These nonionic surfactants can include but are not necessarily limited to acid esters of glycerin, neutrally substituted lecithins, fractionated esters or amides of various fatty acids such as coconut oil, lauric acid, oleic acid, ricinoleic acid, stearic acid and the like, ethylene oxide and propylene oxide adducts of fatty alcohols, sorbitan monooleates, propylene glycol monoesters and monoglycerides, polyoxyethylene sorbitan monolaurate, diglycol tetrastearyl stearate, polyglycol mixed esters, distilled monoglycerides, and the like. Any nonionic surfactant that is soluble or dispersable in water and that will not decrease substantially the coefficient of friction between the prelube filmed metal surface and the stamping presses and/or die beads is sufficient for this invention.

The preferred non-ionic surfactants are those surfactants formed by reacting ethylene oxide, propylene oxide, or mixed ethylene oxide/propylene oxide with fatty alcohols, which fatty alcohols have linear and/or branched aliphatic substituents containing alcohol groups and containing from 10 to 20 carbon atoms. The preferred surfactants are ethylene oxide, propylene oxide and mixed ethylene oxide-propylene oxide adducts of fatty alcohols having linear and/or branched aliphatic substituents containing from 10 to 20 carbon atoms, preferably where the ethylene oxide, propylene oxide and mixed ethylene oxide-propylene oxide adducts are the alkoxylated $C_{10}$–$C_{20}$ fatty alcohols which contain from about 10 to about 40 alkylene oxide units chosen from ethylene oxide, propylene oxide, and mixtures thereof.

These surfactants are normally water soluble but may be water dispersable as well. It is most preferred that the $C_{10}$–$C_{20}$ fatty alcohol has been reacted with ethylene oxide and propylene oxide so that the surfactant contains both ethylene oxide and propylene oxide residuals attached to the alcohol functional group of the $C_{10}$–$C_{20}$ fatty alcohols or alcohol mixtures.

THE CORROSION INHIBITORS

The corrosion inhibitors can include any corrosion inhibitor known to inhibit corrosion of iron or steel surfaces. These corrosion inhibitors can include inorganic corrosion inhibitors such as chromates, but most preferably are chosen from organic corrosion inhibitors such as fatty amines, alcohol amines, amine borates, aminodicarboxylates, alkylamidocarboxylic acids, alkyl sulfonates, and their salts, alkyl and aryl sulfamido carboxylic acids and their salts, phosphate ester amines, imidazolines, substituted imidazolines, and the like. The preferred corrosion inhibitor is capryloamphopropionate, imidazoline, which is based on an imidazoline modified caprylic acid compound. However, it is to be understood that any water soluble corrosion inhibitor or water dispersable corrosion inhibitor may be used in this invention.

THE ANTIFOAMING AGENTS

The anti-foaming agents are optionally used to prevent foaming in the operation or the use of this blanking solution. The blanking solutions are sprayed or misted or wiped onto, or otherwise applied to the surfaces of the steel blanks, which have solid-film prelubes applied thereto such that when this surface is completely or partially dried, it can transfer over transfer wheels and rolls on a transfer line without any solid-film prelube or lubricant being transferred from the blank to the transfer rolls as described above. Since the operation of this procedure can include spraying, misting, or wiping, it has been found advantageous to add to the formulations of these blanking solutions the various types of anti-foaming agents. These antifoams may be based on fatty alcohols, fatty acids, silicone, hydrophobic silicon, ethylene -bis-stearamide, polyalkylene glycols, fatty quaternary amine salts, and the like, or mixtures thereof. Preferably these anti-foaming agents are non-silicone defoaming agents, and most preferably the antifoams are organic defoaming agents available in the chain of commerce. A preferred defoamer is Foamban MS-293 available from Ultra Additives and which is a white, opaque fluid having a specific gravity of 1.038, viscosity of 2500 cps at 77° F. and contains 66.0 weight percent solids in the commercial formulation.

THE MICROBIOCIDES

Finally, to prevent any long term build up of microbiological growth in the blanking solutions, a biocidal or a biocidally active material is also normally incorporated into the blanking solution formulas. Although this material is optional, it is preferred that it be present to prevent any biological growth in the operation, storage or application techniques for the blanking solutions onto the filmed blanks. Preferably the biocide is again an organic biocide, which is soluble or dispersable in water, as represented, preferably, by such a commercial product referred to as Grotan, which is a mixture of 78.5% of hexahydro-1,3,5,-tris (2-hydroxyethyl)-s-triazine and 21.5% water. This biocidal product is a clear, light amber fluid with a mild amine odor and has a specific gravity of 1.158, a refractive index of 1.485, pH of 10.3, and viscosity of 560 SUS at 100° F.

The preferred blanking solutions are those solutions made in the following manner:

To a reaction vessel is added a quantity of deionized water. This deionized water acts a major carrier and film former for the blanking solutions. To this water is added in any sequence the following ingredients:

(1) Monateric 1000, a product of Mona Industries, Inc., which product is described as a capryloamphopropionate, imidazoline surfactant/corrosion inhibitor. Its primary function in this formula is to act as a corrosion inhibitor. This product is a clear amber fluid having a total solids of 50.0 weight per cent a pH as a 10 percent solution in water of 11.2, a specific gravity of 1.05 and a Draves wetting time of 20 seconds or a 0.1 percent by weight active solution. The Monateric 1000 is added to the water so as to obtain a concentration ranging between about 0.05 weight percent to about 5.0 weight percent, preferably between about 0.1 to about 2.5 weight percent.

(2) To this mixture, Mazawet DF, a product of Mazer Chemicals Division of PPG Industries, may be added at a concentration ranging from about 0.05 to about 5.0 weight percent, preferably between 0.25 to about 2.5 weight percent. The Mazawet DF is an alkoxylated alcohol containing both ethylene oxide and propylene oxide on a $C_{10}$–$C_{20}$ fatty alcohol. This product is a clear liquid at ambient temperatures. The product is nonionic and has a specific gravity of 1.06, and a Drave wetting time of 6 seconds as tested in a 0.1 weight percent solution of distilled water at 25° C. at 1 percent aqueous solution of 60° C. The Mazawet DF is water soluble and easily dissolves in the distilled or deionized waters used in the formulations.

(3) To this mixture Grotan biocides manufactured by Lehn and Fink Inc., are added at concentration ranging from about 0 to about 1.0 weight percent. The biocide is an optional ingredient that is preferably present to prevent rampant biological contamination in storage or use of this blanking media. The preferable concentration range is between 0.05 to 0.5 weight percent.

(4) Finally, although optionally used, a defoaming agent is added. Preferably this defoaming agent is Foamban MS-293 obtained from Ultra Additives, which is an organic non-silicone based defoamer. This material is a white, opaque fluid in appearance having a specific gravity of 1.038, viscosity of 2500 cps at 77° F., and is 66 weight percent solids as used. The anti-foaming agent is normally added at a concentration ranging from about 0 to about 1.0 weight percent, preferably between about 0.005 to about 0.5 weight percent.

To further exemplify the use of our blanking solutions the following examples are reported:

EXAMPLES

A stamping trial was underway at an appliance manufacturer in the Central part of the United States. This manufacturer produced a variety of steel parts from galvanized steels. A solid-film prelube was being used in a coating weight range ranging from about 75–100 mg per square foot. This solid-film prelube had been formed from a hot melt formulation as described in U.S. Pat. No. 4,753,743, incorporated herein by reference. However, the use of solid-film prelubes formed from an oil-in-water emulsion, as in U.S. Pat. No. 4,846,986, could also be used.

The manufacturer received their steel coils in-house where they did all of their own blanking. As before, blanking is a process where steel coil is cut into specific sizes, which sheets or blanks are then formed by stamping or drawing on mechanical presses into the desired metal parts. These blanks may be formed and stored in process until needed or may be placed immediately on a blanking line adjacent to the forming press and moved on this line into the presses as required to stamp the parts.

Over a period of time in the use of these dry lubricant films, certain percentages of the film lubricant which were observable, but not measured quantitatively, were transferred onto the transfer rolls and wheels which then transferred back onto the other metal blanks residually filmed lubricant deposits. This caused difficulties in transferring the blanks continuously and cleanly into the stamping presses and causes some minor difficulties in the stamping operations.

To prevent these difficulties from occurring the blanking solutions of this invention were applied as a mist to the surfaces of the pre-cut blanks as the blanks entered the transfer line. A water based formulation was suggested and formulated so as to contain at least 99 percent deionized water, 0.80 weight percent Monateric 1000, 0.15 weight percent Mazawet DF, 0.04 weight percent Grotan, and 0.01 weight percent Foamban MS-293. Each of these materials are described above. The preparation of these materials are also described above and simply requires the admixture, is any order, of the materials within a prescribed concentration range with deionized water.

The above blanking solution was sprayed or misted onto the prefilmed prelube blanks at a rate between about 50 to about 500 mg of blanking solution per square foot of surface area as the blanks entered the transfer line. In the presence of the blanking solution, the transfer of these solid-film prelube and lubricants from the metal surfaces to the transfer rolls and wheels was drastically reduced and eliminated the marring of the prelube film surfaces which in turn eliminated the difficulties in the stamping and drawing operations at this Mid-Continent manufacturer.

Additional tests were run for corrosion protection of the steel coils and blanks cut therefrom in the presence of the blanking solutions of this invention.

Test panels obtained from Advanced Coating Technology, and commonly referred to as (1) ACT GM cold roll steel panels and (2) ACT GM 16-45E hot dip galvanized panels were cleaned by washing in hexane and then air dried. A hot melt solid film prelube was applied to both sides of a series of these various test panels at a coating wight of $300 \pm 10$ mg/ft.$^2$ Panels were aged 24 hours, aqueous blanking solutions spray misted onto all internal panel surfaces at 50 mg/ft.$^2$, then stacks of panels formed. Four panels of the coated substrates were stacked together and held together with four Hoffman "C" clamps, one clamp on each side of the rectangular stacks. The stacks were placed in gravity convention ovens at 75° F. and at 120° F. for 24 hours, after which the stacks were removed, cooled, disassembled and individual panels examined for staining, a sign of corrosion. If no staining was observed the panels were reassembled and tests continued for seven days after which further inspection was done. This procedure was continued for four weeks.

Using the blanking solutions of this invention containing the imidazoline based corrosion inhibitor described above, no corrosion was detected on either type of steel test panels for the four week test period.

Finally, a similar hot melt solid film lubricant was applied to both sides of several 12×2 inch ACT GM-16-45E galvanized steel test panels at a rate to achieve a coating film of solid lubricant of $100 \pm 10$ mg/ft. Aqueous blanking solutions described above were misted on these test strips at about 50 mg/ft.$^2$. Both the original prelubed test strips and the blanking solution test strips were tested to determine drawing characteristics using a Double Draw Bead Simulator. The tests were performed using a pair of mated dies containing a series of fixed draw beads. The test strips were pulled a total of five (5) inches through these mated dies at a rate of 100 inches per minute. The coefficient of friction was calculated for each strip and an average coefficient of friction calculated for each set of three test strips. The results are below:

| Surface Treatment | Ave. Coef. of Friction |
| --- | --- |
| 1. Hot melt solid film prelube (above) | 0.0989 |
| 2. Hot melt solid film prelube and blanking solution | 0.0974 |

It is anticipated that the average coefficient of friction with the blanking solutions of this invention will not change from the coefficient of friction observed with usual hot melt or emulsion based prelube treated steel blanks (test panels) by more than 10 percent in any direction. Therefore, by appreciably change, we mean that the coefficient of friction normally observed in the presence of prelube films as taught herein will not be changed by ±10% in the presence of our blanking solutions, or the surfactant based formulations thereof.

Having described my invention I claim:

1. A method of preventing solid-film prelube and lubricant transfer from solid prelubricant films on metal surfaces to transfer rolls which comprises applying onto the solid prelubricant film on said metal surface an effective amount for the purpose of an aqueous solution containing:

| | Ingredient | Amount |
| --- | --- | --- |
| (1) | A surfactant which does not appreciably change the coefficient of friction between the prelube filmed metal surface and the stamping or drawing dies; | 0.05–5.0% |
| (2) | Corrosion inhibitors | 0.05–5.0% |
| (3) | Anti-foaming agent | 0.0–1.0% |
| (4) | A biocidally active material | 0.0–1.0% |

| | Ingredient | Amount |
| --- | --- | --- |
| (5) | Water deionized | Remainder |

2. The method of claim 1 wherein the solid-film prelube lubricant is applied to the metal surface as an oil-in-water emulsion.

3. The method of claim 1 wherein the solid-film prelube lubricant is applied to the metal surface as an all organic hot-melt formulation.

4. The method of claim 1, 2, or 3 wherein the surfactant is a non-ionic surfactant chosen from the group consisting of ethylene oxide, propylene oxide, and mixed ethylene oxide-propylene oxide adducts of fatty alcohols having linear and/or branched aliphatic substituents containing from 10 to 20 carbon atoms.

5. The method of claim 4 wherein the ethylene oxide, propylene oxide and ethylene oxide, propylene oxide adducts of the $C_{10}$–$C_{20}$ fatty alcohol contains from 10 to about 40 alkylene oxide units chosen from ethylene oxide and propylene oxide and mixtures thereof.

6. A blanking solution comprising:

| | Ingredient | Amount |
| --- | --- | --- |
| 1. | A surfactant which does not appreciably change the coefficient of friction between a prelube filmed metal surface and transfer rolls of a transfer line. | 0.05–5.0 wt % |
| 2. | Corrosion Inhibitors | 0.05–5.0 wt % |
| 3. | Anti-Foaming Agents | 0.0–1.0 wt % |
| 4. | Biocidally active material | 0.0–1.0 wt % |
| 5. | Deionized water | Remainder; | wherein the surfactant is a non-ionic surfactant chosen from alkylene oxide adducts of a $C_{10}$–$C_{20}$ alcohol wherein the alkylene oxide is chosen from ethylene oxide, proplylene oxide and mixtures thereof, and the corrosion inhibitor is an imidazoline corrosion inhibitor.

* * * * *